No. 806,927. PATENTED DEC. 12, 1905.
T. F. SHOEMAKER.
CEMENT BLOCK AND BRICK MACHINE.
APPLICATION FILED APR. 10, 1905.
3 SHEETS—SHEET 1.
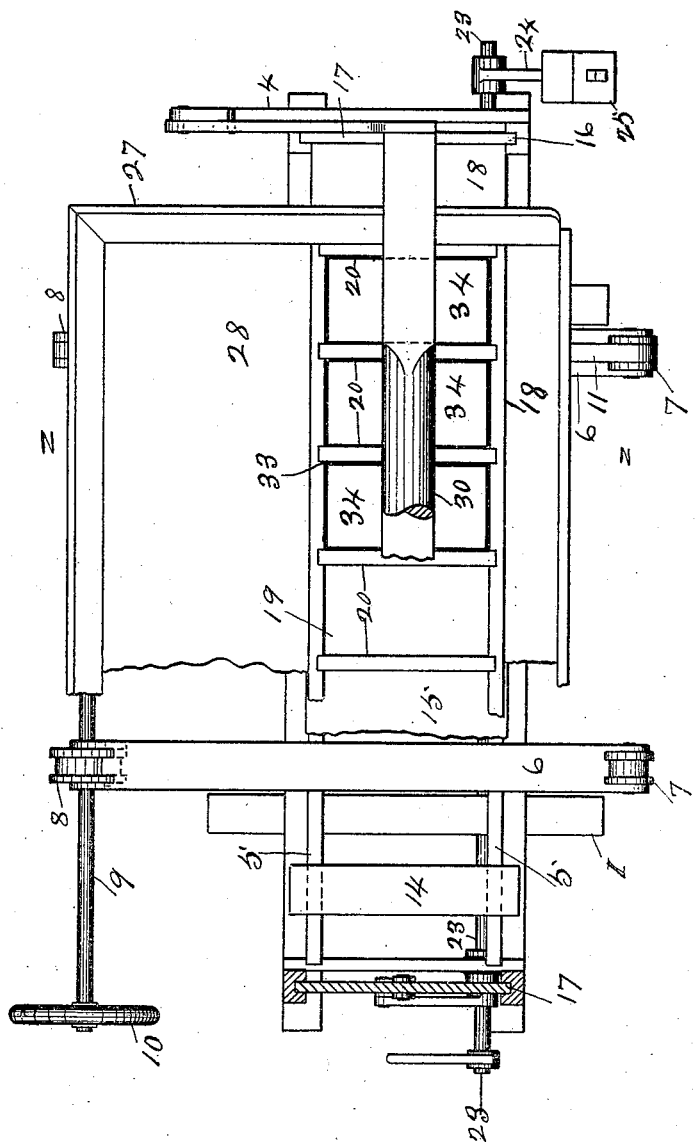
Fig. I.
WITNESSES: Taylor F. Shoemaker INVENTOR.
BY Chapin & Denny
His ATTORNEYS.

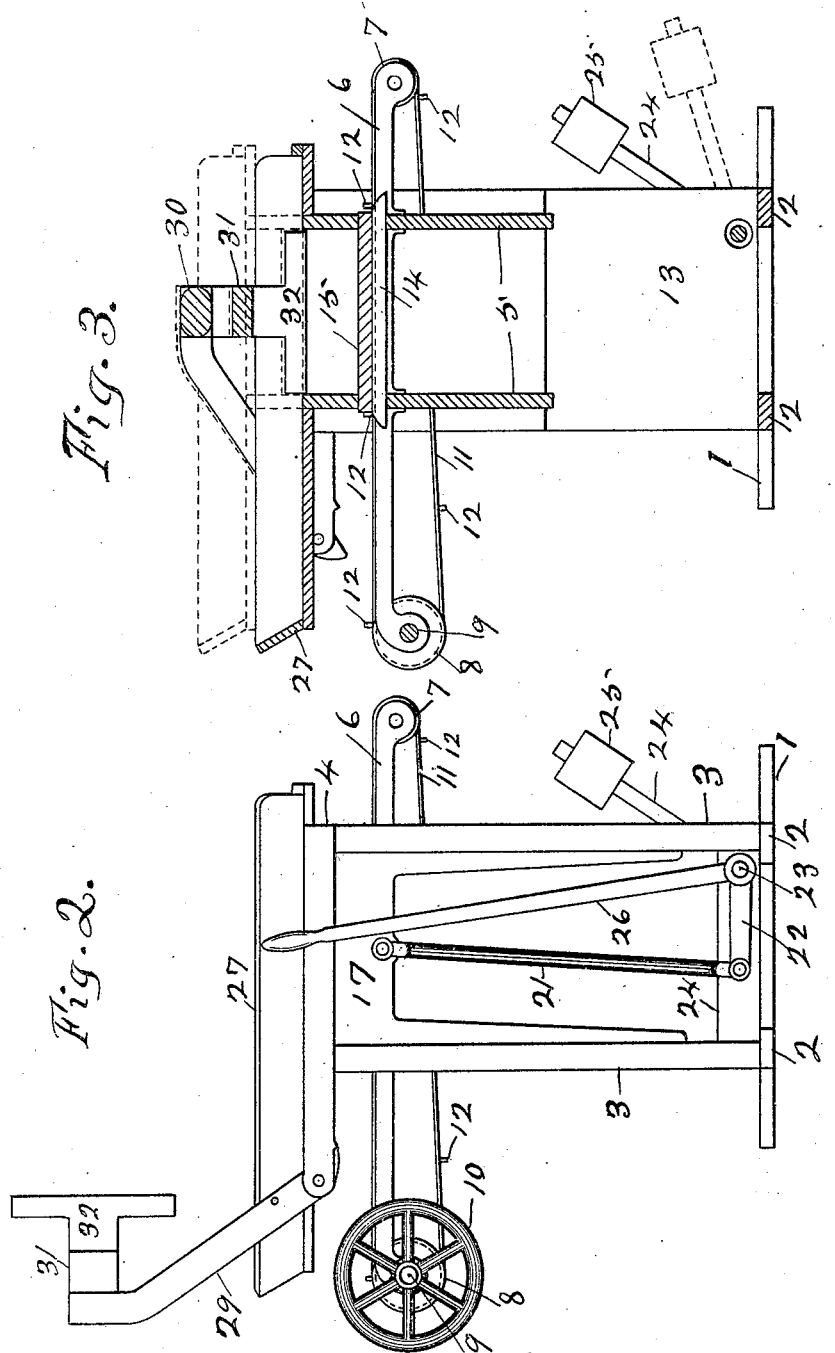
No. 806,927. PATENTED DEC. 12, 1905.
T. F. SHOEMAKER.
CEMENT BLOCK AND BRICK MACHINE.
APPLICATION FILED APR. 10, 1905.
3 SHEETS—SHEET 2.

No. 806,927. PATENTED DEC. 12, 1905.
T. F. SHOEMAKER.
CEMENT BLOCK AND BRICK MACHINE.
APPLICATION FILED APR. 10, 1905.
3 SHEETS—SHEET 3.
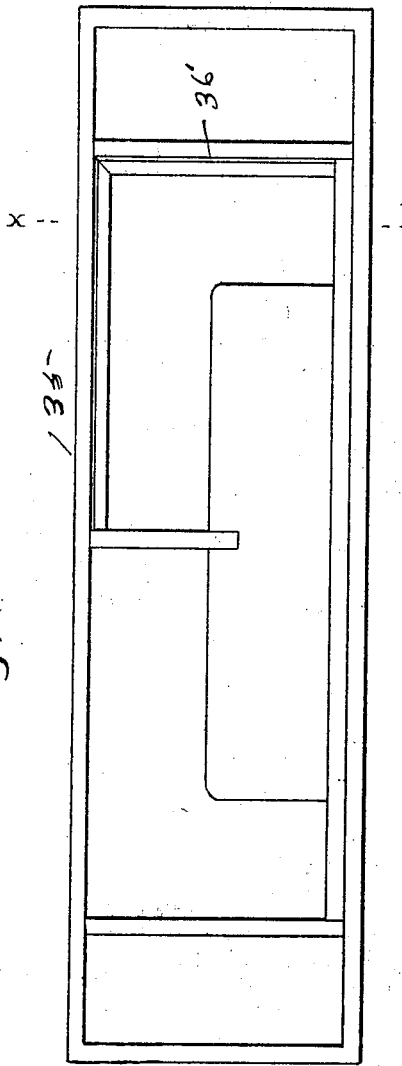
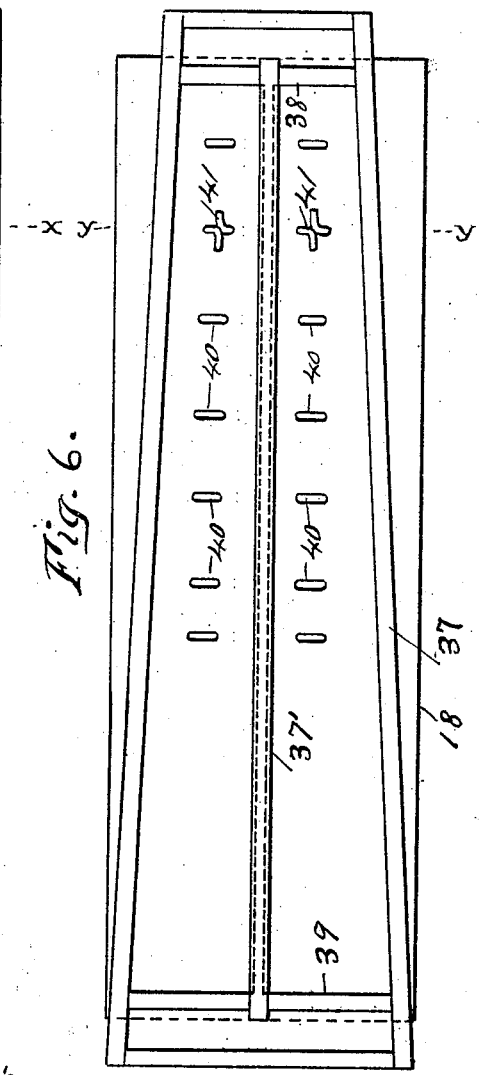
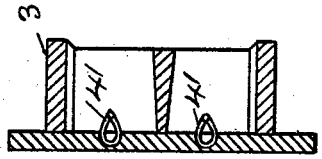

UNITED STATES PATENT OFFICE.

TAYLOR F. SHOEMAKER, OF BLUFFTON, INDIANA.

CEMENT BLOCK AND BRICK MACHINE.

No. 806,927. Specification of Letters Patent. Patented Dec. 12, 1905.

Application filed April 10, 1905. Serial No. 254,806.

*To all whom it may concern:*

Be it known that I, TAYLOR F. SHOEMAKER, a citizen of the United States, residing at Bluffton, in the county of Wells, in the State of Indiana, have invented certain new and useful Improvements in Cement Block and Brick Machines; and I do hereby declare that the following is a full, clear, and exact description of the invention, which will enable others skilled in the art to which it appertains to make and use the same, reference being had to the accompanying drawings, which form part of this specification.

My invention relates to improvements in cement block and brick machines.

The object of my present invention is to provide a comparatively cheap, simple, efficient machine for making cement blocks and bricks positive and reliable in action and having a novel and convenient means for delivering the same from the machine when molded.

Another object of my invention is to provide a machine which is not only adapted for making cement blocks and brick, but which can also be readily adapted for making cement fence-posts, steps, window-caps, window-sills, and the like by a slight and convenient change in the mechanism.

My invention consists of an upright supporting-frame on which is adjustably mounted a vertically-movable table for the plastic material and a vertically-adjustable mold arranged in a longitudinal opening in the said table and having a fixed relation thereto, laterally-movable pallets in coöperative relation with the said mold, means for vertically actuating the said table and molds, means for discharging the molded block or product from the mold, and means for delivering the loaded pallet to the convenient reach of the operator.

The principal novel feature of my invention resides in the improved means for discharging the cement block from the mold and for delivering it forward upon its supporting-pallet to the convenient reach of the operator.

Similar reference-numerals indicate like parts in the several views of the accompanying drawings, in which—

Figure 1 is a top plan of my invention, broken away in part to show the means for delivering the loaded pallets forward. Fig. 2 is an end elevation of the same with the block-discharging means thrown back into the position it assumes when the molds are being filled and also shows the means for vertically adjusting the mold. Fig. 3 is a cross-section of the same on the line $z\ z$ of Fig. 1, showing in dotted outline the upper limit of the vertically-adjustable mold and table. Fig. 4 is a bottom plan of a corner-block mold with the pallet removed, showing a mold adapted for a cement block having its edges either beveled or not, as desired. Fig. 5 is a cross-section of the same on the line $x\ x$ of Fig. 4 with the pallet in position, showing how with a beveled edge the block can readily be discharged from the mold. Fig. 6 is a top plan of a fence-post mold in position upon a supporting-pallet having a series of vertical recesses in its inner face to receive the outer ends of wire loops, whose inner adjacent ends are embedded in the post when molded, two of the said wire loops being shown in position in the said recesses. Fig. 7 is a cross-section of Fig. 6 on the line $y\ y$ of Fig. 6, showing the wire loops in position in the retaining-recesses of the mold.

The supporting-frame for my invention may be of any suitable form, but preferably consists of the horizontal transverse plates 1, in parallel arrangement rigidly connected by the parallel longitudinal plates 2, forming the base of the frame. Upon this base are rigidly erected the four uprights 3, rigidly connected transversely at their upper ends by the plates 4, and are rigidly stayed by the longitudinal parallel plates 5, which are also supported by the upright plates 13, fixed on the plate 2, Fig. 3. Upon the upper edge of these plates 5 are fixed in parallel transverse arrangement the horizontal bars 6, in whose opposite bifurcated ends are rotatably mounted the respective pulleys 7 and 8, the latter of which is rigidly connected by rotatable shaft 9, passing concentrically through the same and having upon one end thereof the fixed hand-wheel 10, by which this shaft 9 is actuated. The pulleys 7 and 8 are operatively connected by the respective endless belts 11, of any suitable material and passing over the same and provided upon their outer face with the fixed pins 12, in predetermined arrangement for the purpose about to be described.

Upon the plates 5 are fixed a plurality, preferably three, transverse pieces 14. Upon these pieces 14 is loosely arranged the pallet 15, which also rests upon the two belts 11 between two of the fixed pins 12, which engage its opposite edges, as shown in Fig. 3, for the purpose of moving the loaded pallet forward and to move another pallet forward to take its place in the manner hereinafter described.

In opposite vertical grooves 16 in the inner faces of the upright standards 3 at each end of the machine are slidably mounted the bifurcated standards 17, to the inner face of whose upper ends are detachably connected the opposite ends of the molds 18, Fig. 1, which may be either for solid cement blocks, bricks, fence-posts, or other products.

The mold shown in position in Fig. 1 is for cement bricks and is adapted to make a plurality of them at one time, preferably six, as shown, and consists of the compartments 19, separated by the fixed transverse partitions 20. To the top of the standards 17 are pivotally mounted the upper ends of the respective duplicate operating-rods 21, whose lower ends are pivotally connected to one end of the short duplicate lever-arms 22, whose other ends are rigidly mounted on the opposite and respective projecting ends of the horizontal shaft 23, which is rotatably mounted in suitable bearings in the cross-plates 24, fixed to the standards 3 at or near their lower ends. On the other extended end of this shaft 23 is fixed a short shaft 24', carrying upon its free end a counterbalancing-weight 25, normally elevated to the inclined position (shown in full lines in Fig. 3) and adapted to aid in the vertical adjustment of the mold. On the other end of the shaft 23, adjacent to the lever 22, is fixed the lower end of the hand-lever 26, whose normal position is substantially vertical, as shown, and by means of which the vertically-movable standards 17 are actuated.

Upon the mold 18 is removably mounted the feed-table 27, having a longitudinal opening substantially coincident with that portion of the mold having the compartments 19 and has upon its rear portion a sufficient space to form a work-board 28 to receive the plastic material, from which it is fed or deposited in the usual or other proper manner in the mold 18.

To the rear extended end of the plates 4 are pivotally mounted the duplicate arms 29, to whose forward ends is rigidly fixed the handle-bar 30. To the lower face of the bar 30 near its opposite ends are rigidly fixed the blocks 31, to whose lower face in turn are rigidly fixed the opposite ends of the releasing-bar 32, whose lower face is provided with a series of transverse slots 33, coincident with the partitions 20 and adapted to receive the same, thereby dividing the lower face into a series of pendent projections 34, adapted to snugly fit and be received by the respective compartments 19 for the purpose of aiding in the discharge of the blocks from the mold.

The operation and manner of employing my invention thus described are obvious and, briefly stated, are as follows: The plastic cement having been previously placed upon the work-board 28 and the pallet 15 being in position, as described, beneath the mold, the operator fills the molds 18 from the board 28, after which he lowers the releasing-bar 32 upon the mold, whereby each projection 34 will rest upon its respective block in the compartments 19. He then pushes the lever 26 forward, thereby elevating the mold as well as the surmounted table 27 to the limit of their upward movement, as shown in Fig. 3, this movement being aided by the simultaneously-descending weight 25, which is of sufficient gravity to temporarily retain the mold in its elevated position. This movement of the molds correspondingly forces the releasing-bar into a loosening contact with the contents of the mold, and thereby discharges them from the mold to the pallet 15, which during this operation is of course stationary, one pallet being in position directly beneath the mold and another one being arranged upon the said belts directly at the rear of the said first pallet. The operator now seizes the hand-wheel 10 and rotates it to the right, thereby carrying the loaded pallet forward upon the forward end of the carrier-belts 11 to a point within convenient reach of the operator, who then removes the same. As this loaded pallet is thus brought forward the one before mentioned as being immediately in its rear is simultaneously advanced to a position directly beneath the mold, after which the mold and table are lowered to their normal position, the mold resting upon the pallet, as before. By this means it is obvious that the bricks or blocks when molded can readily be delivered from the molds to the operator without removing the mold.

The mold 35 for corner blocks or bricks (shown in Figs. 4 and 5) is employed in the same manner as above described and is arranged to mold two such blocks at a time, either with or without beveled edges, the portion 36 being for beveling the two outer edges of the blocks, and the portion 36' being designed for blocks without beveled edges. The pallet 18 is shown in Fig. 5, but is removed in Fig. 4.

The fence-post mold (shown in Figs. 6 and 7) is also employed in a similar manner as above described. This mold consists of a tapering frame 37, longitudinally divided by a central partition 37', whose lower and opposite edges are chamfered or beveled to facilitate the discharge of the posts from the mold. The partition 37' is rigidly secured at its ends by means of the cross-pieces 38 and 39. The pallet 18, which is employed with the fence-post mold, preferably has a series of short transverse recesses 40, properly spaced near its upper end to receive the looped end of short wire loops 41, whose free ends are firmly embedded in the molded post to secure the line-wires of a wire fence in a well-understood manner. The molding of these posts and their discharge from the mold are the same as above described. In like manner molds for making cement window caps and sills and similar products may be employed in my machine.

I have shown the carrier-belts 11 as made of leather, though they may be sprocket-chains instead, if preferred, without departing from the spirit and scope of my invention.

Having thus described my invention and the manner of employing the same, what I desire to secure by Letters Patent is—

1. In a cement-block machine, an upright supporting-frame; horizontal bars arranged transversely of said frame with rotatable pulleys mounted on the opposite ends of each bar; an endless belt passing over the pulleys of each of said bars provided with means for engaging with a pallet supported on said belt; a pallet mounted on said carrier-belts and transverse bars in said frame; a mold vertically adjustable relatively to said pallet and arranged in coöperative relation therewith; (bifurcated) vertical standards slidably mounted in grooves in the inner faces of upright standards at each end of the machine, and secured at their upper ends to the mold-box; duplicate operating-rods pivotally connected at their upper ends with said bifurcated standards and at their lower ends pivotally connected to one end of a lever whose other end is rigidly mounted upon a rotatable horizontal shaft; an upright operating-lever connected with said rotatable horizontal shaft to elevate and lower the said standards supporting said molding-box; and means for actuating the carriers to remove the loaded pallet from beneath the mold when elevated.

2. In a machine of the class specified, a supporting-frame; horizontal bars arranged transversely of said frame with rotatable pulleys mounted in bifurcated opposite ends of each bar; an endless belt mounted in each of said bars provided with means for a holding engagement with a pallet carried on said belts; a pallet loosely mounted on said carrier-belts and transverse bars in said frame; a mold vertically adjusted relatively to said pallet and arranged in coöperative relation therewith; a work-board mounted on the frame in coöperative relation to the mold; vertical standards slidably mounted in the inner faces of upright standards at each end of the machine and secured at their upper ends to the mold-box; duplicate operating-rods, pivotally connected at their upper ends with said slidably-mounted standards and at their lower ends pivotally connected to one end of a lever whose other end is rigidly mounted upon a rotatable horizontal shaft; an upright operating-lever connected with said rotatable horizontal shaft adapted to elevate and lower the said standards supporting said molding-box and means for actuating the carriers to remove the loaded pallet from beneath the mold when elevated.

Signed by me at Bluffton, county of Wells, State of Indiana, this 31st day of March, A. D. 1905.

TAYLOR F. SHOEMAKER.

Witnesses:
FRANK W. GORDON,
LEVI A. TODD.